(12) United States Patent
Tanioka

(10) Patent No.: US 11,187,301 B2
(45) Date of Patent: Nov. 30, 2021

(54) MECHANICAL PARADOX PLANETARY GEAR MECHANISM

(71) Applicant: Sinfonia Technology Co., Ltd., Tokyo (JP)

(72) Inventor: Hiroki Tanioka, Tokyo (JP)

(73) Assignee: Sinfonia Technology Co., Ltd., Tokyo (JP)

( * ) Notice: Subject to any disclaimer, the term of this patent is extended or adjusted under 35 U.S.C. 154(b) by 0 days.

(21) Appl. No.: 16/952,265

(22) Filed: Nov. 19, 2020

(65) Prior Publication Data

US 2021/0172500 A1 Jun. 10, 2021

(30) Foreign Application Priority Data

Nov. 20, 2019 (JP) .............................. JP2019-209286

(51) Int. Cl.
*F16H 1/28* (2006.01)
*F16H 1/32* (2006.01)
*B64C 13/34* (2006.01)

(52) U.S. Cl.
CPC ............... *F16H 1/32* (2013.01); *B64C 13/34* (2013.01); *F16H 1/28* (2013.01); *F16H 2001/289* (2013.01); *F16H 2001/327* (2013.01)

(58) Field of Classification Search
CPC ..................... F16H 2001/289; F16H 2057/085
USPC ......................................................... 475/342
See application file for complete search history.

(56) References Cited

U.S. PATENT DOCUMENTS

| 1,799,740 A | * | 4/1931 | Felton | ....................... F16H 1/46 475/342 |
| 1,912,801 A | * | 6/1933 | Stephenson | ............... F16H 1/28 475/342 |
| 2,124,078 A | * | 7/1938 | Palmer | .................... B64C 11/44 416/155 |
| 3,081,648 A | * | 3/1963 | Duer | ........................ F16H 1/28 475/345 |

(Continued)

FOREIGN PATENT DOCUMENTS

| JP | 2004019900 A | 1/2004 |
| JP | 2005-016695 | 1/2005 |
| WO | 2009011682 A1 | 1/2009 |

OTHER PUBLICATIONS

Europe Patent Application No. 20208127.9, Extended European Search Report, dated Apr. 6, 2021.

*Primary Examiner* — Sherry L Estremsky
(74) *Attorney, Agent, or Firm* — Kilpatrick Townsend & Stockton LLP

(57) ABSTRACT

There is provided a mechanical paradox planetary gear mechanism, including: a sun gear configured to be rotatable together with rotation of an input shaft; a plurality of first planetary gears arranged around the sun gear at equal intervals, and configured to rotate about their own axes while revolving around the sun gear in a state in which the first planetary gears mesh with the sun gear; a first internal gear arranged around the plurality of first planetary gears, and configured to mesh with the plurality of first planetary gears; a second internal gear arranged in the same axis as the first internal gear; and a plurality of second planetary gears respectively arranged on the same axes as the plurality of first planetary gears, and configured to mesh with the second internal gear.

6 Claims, 4 Drawing Sheets

(56) References Cited

U.S. PATENT DOCUMENTS

| | | | |
|---|---|---|---|
| 4,180,222 A * | 12/1979 | Thornburg | B64C 9/06 |
| | | | 244/225 |
| 6,626,792 B2 | 9/2003 | Vranish | |
| 7,837,202 B2 * | 11/2010 | Taneda | B60G 21/0556 |
| | | | 280/5.511 |
| 10,024,449 B2 * | 7/2018 | Ohashi | F16H 35/10 |
| 10,399,669 B2 * | 9/2019 | Viennot | B64C 13/34 |

* cited by examiner

MECHANICAL PARADOX PLANETARY GEAR MECHANISM

CROSS-REFERENCE TO RELATED APPLICATION(S)

This application is based upon and claims the benefit of priority from Japanese Patent Application No. 2019-209286, filed on Nov. 20, 2019, the entire contents of which are incorporated herein by reference.

TECHNICAL FIELD

The present disclosure relates to a mechanical paradox planetary gear mechanism applicable to an electric actuator for a rudder surface of an aircraft or the like.

BACKGROUND

An aircraft in flight moves ailerons (auxiliary wings) as it rolls, and actuators for steering the ailerons are installed inside the wings. Until now, hydraulic actuators have been mainly used. However, in recent years, the electrification of devices used in an aircraft has proceeded, and the use of electric actuators has been studied.

Since an actuator needs to be arranged inside a wing, the actuator for the rudder surface is required to be smaller and lighter. Furthermore, it is necessary for the actuator to receive a high torque. For that purpose, there is a limitation that the actuator should have a high reduction ratio.

Thus, the present inventor has diligently worked to realize the practical application of an electric actuator that meets the above requirements by using a mechanical paradox planetary gear mechanism. The mechanical paradox planetary gear mechanism has a configuration in which a sun gear attached to a rotation shaft as an input shaft and a plurality of planetary gears arranged around the sun gear at equally-divided circumferential positions mesh with each other, the planetary gears also mesh with a fixed internal gear and a movable internal gear arranged on the same axis and having different numbers of teeth, and the rotation speed of the sun gear is reduced according to the difference in the number of teeth between the fixed internal gear and the movable internal gear.

In such a mechanical paradox planetary gear mechanism, the plurality of planetary gears arranged at equal intervals around the sun gear should be meshed with both internal gears (the fixed internal gear and the movable internal gear) having different numbers of teeth. Therefore, it is necessary to take measures such as clearing the above conditions by, for example, appropriately adjusting the shift coefficient of the planetary gears.

However, if a large number of planetary gears are arranged around the sun gear in order to share a high torque, there is a possibility that the shift adjustment becomes complicated and all the planetary gears cannot properly mesh with both the fixed internal gear and the movable internal gear having different numbers of teeth.

Thus, for example, Patent Document 1 discloses, as a mechanical paradox planetary gear mechanism capable of stabilizing an operation and increasing an output torque resistance by employing a plurality of planetary gears, a configuration in which planetary gears are composed of first planetary gears meshing with a sun gear and a fixed internal gear, and second planetary gears having the same number of teeth as the first planetary gears and meshing with a movable internal gear, and in which the second planetary gears not meshing with the sun gear are fixed to the first planetary gears at positions where the second planetary gears mesh with the movable internal gear.

Specifically, there are disclosed a configuration in which rotation shafts provided on second planetary gears in a non-rotatable manner are inserted into three first planetary gears arranged at equal intervals around a sun gear and in which the first planetary gears are fixed to the second planetary gears at relative positions where the phase difference between the first planetary gears and the second planetary gears becomes T/3 (T is a tooth pitch) or 2T/3 depending on the setting position, and a configuration in which the first planetary gears and the second planetary gears are integrally installed at a predetermined phase difference by a molding method using resin or metal.

PRIOR ART DOCUMENT

Patent Document

Patent Document 1: Japanese Patent Application Publication No. 2005-16695

However, in the mechanical paradox planetary gear mechanism disclosed in Patent Document 1, if a configuration is adopted in which the first planetary gears and the second planetary gears are fixed at a predetermined phase difference in a state in which the rotation shafts provided on the second planetary gears are inserted into the first planetary gears, it is required to perform a process in which the first planetary gears and the second planetary gears as separate parts are fixed while positioning them with high accuracy. If the positioning accuracy is even slightly inferior, there may be a situation that the planetary gears cannot be meshed with both the fixed internal gear and the movable internal gear.

Furthermore, if a configuration is adopted in which the first planetary gears and the second planetary gears are integrally provided as resin molded products or metal molded products at a predetermined phase difference, when the planetary gears are arranged at three locations around the sun gear at equal pitches, the same number of molds as the number of planetary gears are required because the phase differences between the first planetary gears and the second planetary gears constituting the planetary gears are different as described above. This directly leads to a cost increase.

SUMMARY

The present disclosure has been made focusing on such a problem, and provides a mechanical paradox planetary gear mechanism in which planetary gears meshing with two internal gears having different numbers of teeth can be integrally rotatably assembled at a predetermined phase difference with high accuracy and in which common gears can be used as planetary gears arranged at equal pitches around the sun gear.

A mechanical paradox planetary gear mechanism according to the present disclosure includes: a sun gear configured to be rotatable together with rotation of an input shaft; a plurality of first planetary gears arranged around the sun gear at equal intervals, and configured to rotate about their own axes while revolving around the sun gear in a state in which the first planetary gears mesh with the sun gear; a first internal gear arranged around the plurality of first planetary gears, and configured to mesh with the plurality of first planetary gears; a second internal gear arranged in the same axis as the first internal gear; a plurality of second planetary gears respectively arranged on the same axes as the plurality of first planetary gears, and configured to mesh with the second internal gear; a plurality of collars mounted on inner circumferences of the first planetary gears and the second planetary gears arranged on the same axes, and configured to be rotatable integrally with the first planetary gears and the second planetary gears on the same axes; a plurality of shafts configured to rotatably support the collars, respectively; and a carrier configured to support the plurality of shafts so as not to be rotatable relative to each other, wherein one of the first internal gear and the second internal gear is a rotatable movable internal gear, and the other of the first internal gear and the second internal gear is a non-rotatable fixed internal gear. The first planetary gears and the second planetary gears have the same number of teeth, and include axially-extending gear-side engaging portions formed on inner circumferential surfaces of the first planetary gears and the second planetary gears, respectively. The collars include, on outer circumferential surfaces of the collars, first collar-side engaging portions capable of engaging with the gear-side engaging portions of the first planetary gears and second collar-side engaging portions capable of engaging with the gear-side engaging portions of the second planetary gears. The first collar-side engaging portions and the second collar-side engaging portions are position-shifted in a circumferential direction of the collars, according to a phase difference between the first planetary gears and the second planetary gears on the same axes calculated based on at least a difference in the number of teeth between the movable internal gear and the fixed internal gear. If the first planetary gears and the second planetary gears on the same axes have the same phase (if the phase difference between the first planetary gears and the second planetary gears on the same axes is zero), the first collar-side engaging portions and the second collar-side engaging portions have the same position in the circumferential direction of the collars.

In the mechanical paradox planetary gear mechanism according to the present disclosure, by bringing the gear-side engaging portions of the first planetary gears into engagement with the first collar-side engaging portions of the collars and bringing the gear-side engaging portions of the second planetary gears into engagement with the second collar-side engaging portions of the collars, it is possible to maintain a state in which the first planetary gears and the second planetary gears are assembled to the collar at the same phase or at a predetermined phase difference. The first planetary gears and the second planetary gears are supported by the shafts so as to be rotatable in the forward and reverse directions in a state in which they can rotate integrally with the collars while maintaining a predetermined phase difference. Therefore, if the first internal gear is a rotatable movable internal gear and the second internal gear is a non-rotatable fixed internal gear, when the sun gear rotates integrally with the directly or indirectly connected input shaft, the plurality of first planetary gears arranged at equal intervals in the circumferential direction mesh with the first internal gear while rotating their own axes, and the plurality of second planetary gears connected to the first planetary gears by the collars and the shafts revolve by meshing with the second internal gear. Due to the rotation, the first internal gear, which is a movable internal gear, is rotated so that the rotation is transmitted to a predetermined output shaft via the carrier. While the rotation of the input shaft is transmitted to the output shaft in this way, the rotation of the input shaft is decelerated at a predetermined ratio according to the difference in the number of teeth between the first internal gear and the second internal gear. The mechanical paradox planetary gear mechanism according to the present disclosure also includes a configuration in which the first internal gear is a fixed internal gear and the second internal gear is a movable internal gear. Even with such a configuration, while the rotation of the input shaft is transmitted to the output shaft, the rotation of the input shaft is decelerated at a predetermined ratio according to the difference in the number of teeth between the first internal gear and the second internal gear.

BRIEF DESCRIPTION OF DRAWINGS

The accompanying drawings, which are incorporated in and constitute a part of the specification, illustrate embodiments of the present disclosure.

DETAILED DESCRIPTION

Reference will now be made in detail to various embodiments, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, systems, and components have not been described in detail so as not to unnecessarily obscure aspects of the various embodiments.

Hereinafter, an embodiment of the present disclosure will be described with reference to the drawings. The mechanical paradox planetary gear mechanism X according to the present embodiment is applicable to, for example, an actuator mounted in a wing of an aircraft and configured to steer an aileron. The actuator includes a motor (not shown) serving as a drive source and a speed reducer for reducing an output rotation speed of the motor. The speed reducer includes the mechanical paradox planetary gear mechanism X according to the present embodiment.

Figure 1A:
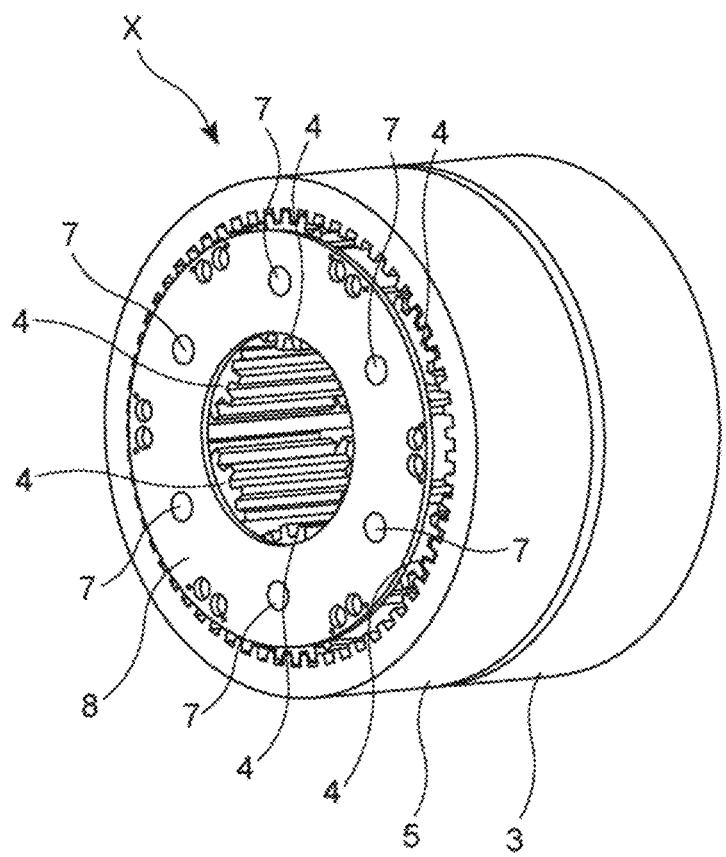
FIGS. 1A and 1B are an overall external view and a schematic sectional view of a mechanical paradox planetary gear mechanism according to an embodiment of the present disclosure.
Figure 1B:
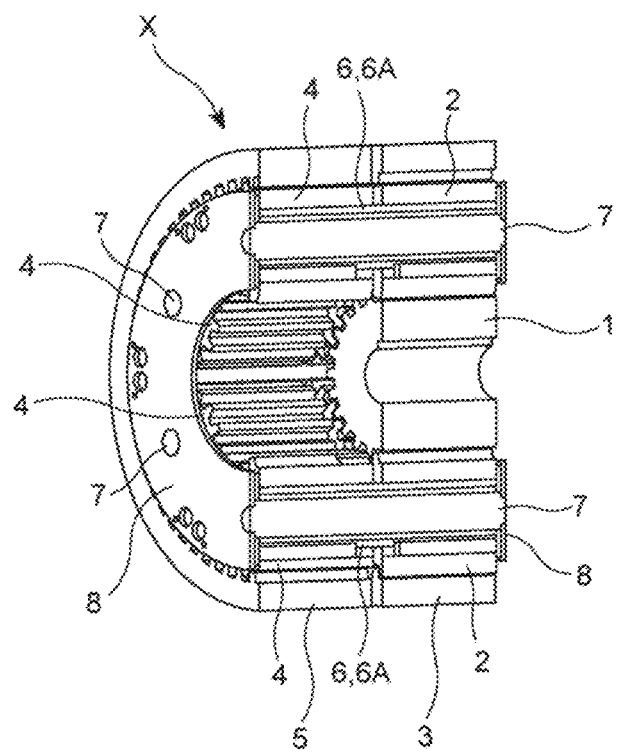
Figure 2:
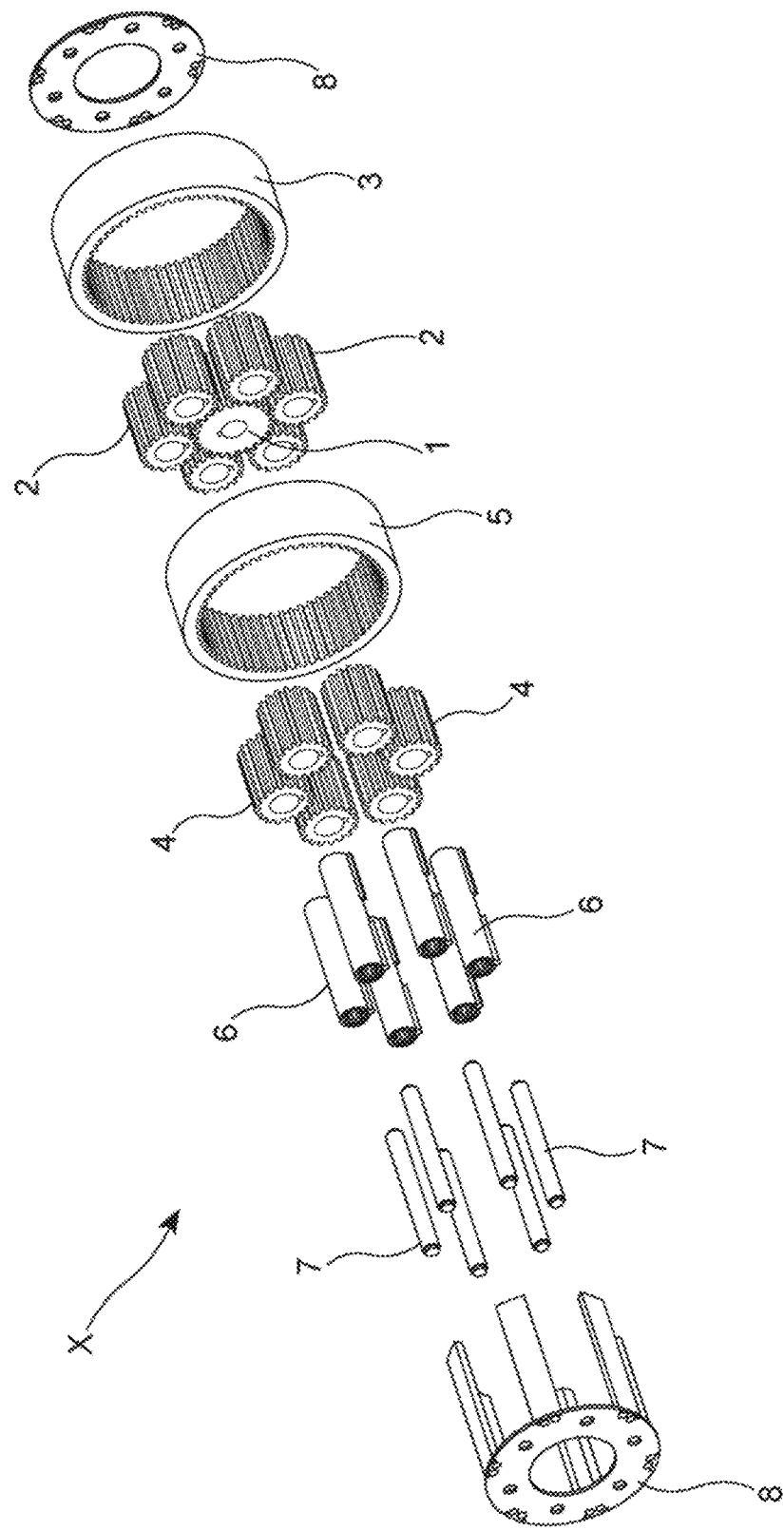
FIG. 2 is an exploded view of the mechanical paradox planetary gear mechanism according to the embodiment.
Figure 3:
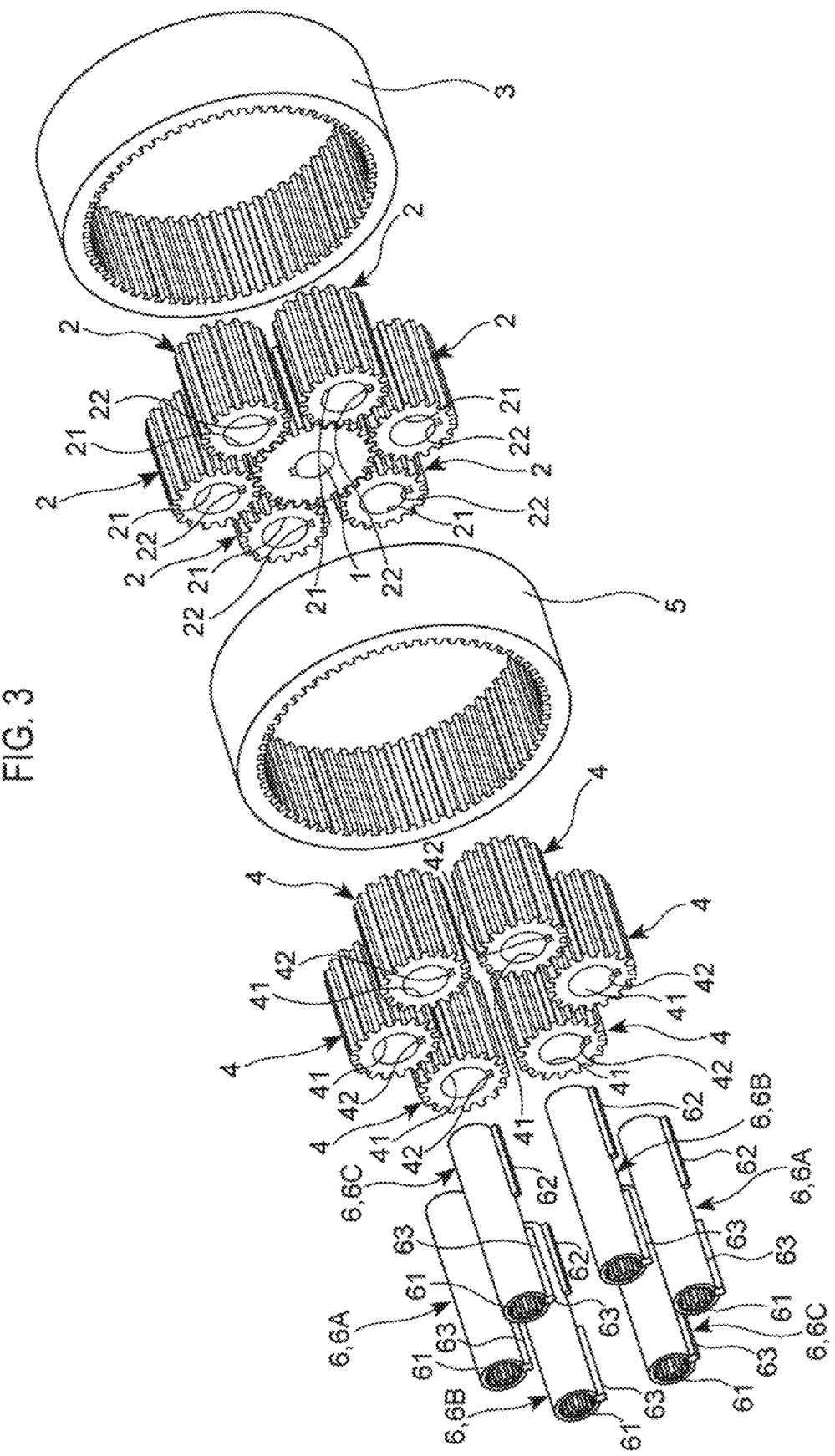
FIG. 3 is an enlarged view of main parts of the mechanical paradox planetary gear mechanism shown in FIG. 2.

As shown in FIGS. 1A to 3 (FIG. 1A is an overall external view of the mechanical paradox planetary gear mechanism X, FIG. 1B is a vertical sectional view of the mechanical paradox planetary gear mechanism X divided into two parts, FIG. 2 is an exploded perspective view of the mechanical paradox planetary gear mechanism X, and FIG. 3 is an enlarged view of main parts of the mechanical paradox planetary gear mechanism shown in FIG. 2), the mechanical paradox planetary gear mechanism X includes a sun gear 1, first planetary gears 2 arranged at equal pitches around the sun gear 1, a first internal gear (a movable internal gear 3 in the present embodiment) arranged around the first planetary gears 2, second planetary gears 4 arranged on the same axes as the first planetary gears 2, a second internal gear (a fixed internal gear 5 in the present embodiment) arranged around the second planetary gears 4, collars 6 configured to rotatably hold the first planetary gears 2 and the second planetary gears 4, shafts 7 configured to rotatably support the collars 6, and a carrier 8 configured to support the shafts 7 so as not to be rotatable relative to each other.

The first planetary gears 2 and the second planetary gears 4 have the same shape, and have the same number of teeth and the same pitch of teeth. The number of teeth of the first planetary gears 2 and the second planetary gears 4 in the present embodiment is 17. Collar insertion holes 21 and 41 having an inner diameter slightly larger than the diameter of the outer peripheral surfaces of the collars 6 are formed in the central portions of the first planetary gears 2 and the second planetary gears 4. The collar insertion holes 21 and 41 are defined by the inner circumferential surfaces of the first planetary gears 2 and the second planetary gears 4. In the present embodiment, gear-side engaging portions 22 and 42 extending in the axial direction (insertion/detachment direction of the collars 6) are formed at one locations in the collar insertion holes 21 and 41 of all the planetary gears (the first planetary gears 2 and the second planetary gears 4). In the present embodiment, the gear-side engaging portions 22 and 42 are used as key grooves extending over the entire axial length of the planetary gears (the first planetary gears 2 and second planetary gears 4).

In the mechanical paradox planetary gear mechanism X of the present embodiment, six first planetary gears 2 are arranged at equal pitches around the sun gear 1, and the second planetary gears 4 are arranged on the same axes as the first planetary gears 2 so that the second planetary gears 4 can be integrally rotated with the first planetary gears 2. The first planetary gears 2 and the second planetary gears 4 arranged on the same axes are held in a state in which the relative positions thereof are determined by the common collars 6. The number of teeth of the sun gear 1 according to the present embodiment is 24.

Shaft insertion holes 61 through which the shafts 7 can be inserted are formed in the central portions of the collars 6, respectively. Both ends of each of the shafts 7 inserted into the shaft insertion holes 61 respectively defined by the inner circumferential surfaces of the collars 6 are fixed to the disk-shaped carrier 8 in a non-rotatably fitted state. The shafts 7 have such a shape that the shafts 7 are longer in the axial direction than the collars 6 by at least the length at which the shafts 7 are fitted to the carrier 8. The number of collars 6 and shafts 7 is the same as the number of first planetary gears 2 arranged around the sun gear 1. Therefore, the number of collars 6 and shafts 7 according to the present embodiment is six.

On the outer circumferential surfaces of the collars 6, there are provided first collar-side engaging portions 62 capable of engaging with the gear-side engaging portions 22 of the first planetary gears 2 and second collar-side engaging portions 63 capable of engaging with the gear-side engaging portions 42 of the second planetary gears 4. In the present embodiment, the first collar-side engaging portions 62 and the second collar-side engaging portions 63 are used as convex keys capable of being fitted into the key grooves 22 and 42 provided at the collar insertion holes 21 and 41 of the first planetary gears 2 and the second planetary gears 4.

The movable internal gear 3 and the fixed internal gear 5 arranged in the same axis have different numbers of teeth from each other. The mechanical paradox planetary gear mechanism X of the present embodiment adopts a movable internal gear 3 having 60 teeth and a fixed internal gear 5 having 58 teeth. Therefore, the difference in the number of teeth between the movable internal gear 3 and the fixed internal gear 5 is 2. Six first planetary gears 2 are arranged at equal pitches on the inner circumference of the movable internal gear 3 so as to mesh with the movable internal gears 3, and six second planetary gears 4 are arranged at equal pitches on the inner circumference of the fixed internal gear 5 on the same axes as the first planetary gears 2 so as to mesh with the fixed internal gear 5. Therefore, among the sets of the first planetary gears 2 and the second planetary gears 4 arranged on the same axes (the planetary gear sets), the planetary gear set arranged at a certain reference position and the planetary gear set arranged at a position rotated 180 degrees from the reference position around the axis of the sun gear 1 are coincident in the phase of the first planetary gear 2 and the second planetary gear 4. On the other hand, the planetary gear sets arranged at other positions are different in the phase of the first planetary gear 2 and the second planetary gear 4.

Thus, in the present embodiment, as shown in FIG. 3, the collars 6 include reference collars 6A provided so that the first collar-side engaging portions 62 and the second collar-side engaging portions 63 are linearly arranged in the axial direction, first phase difference collars 6B in which the second collar-side engaging portions 63 are shifted 7.1 degrees from the first collar-side engaging portions 62 around the axes of the collars 6, and second phase difference collars 6C in which the second collar-side engaging portions 63 are shifted 14.2 degrees from the first collar-side engaging portions 62 around the axes of the collars 6. By bringing the respective gear-side engaging portions 22 and 42 of the first planetary gears 2 and the second planetary gears 4 into engagement with the first collar-side engaging portions 62 or the second collar-side engaging portions 63 of the reference collars 6A, the first phase difference collars 6B, and the second phase difference collars 6C, it is possible to prepare planet-gear-mounted collars in which the phase differences between the first planetary gears 2 and the second planetary gears 4 are distinguished into three predetermined patterns.

The phase difference between the first collar-side engaging portions 62 and the second collar-side engaging portions 63 in the first phase difference collars 6B and the second phase difference collars 6C (the shift amount of the second collar-side engaging portions 63 with respect to the first collar-side engaging portions 62) may be calculated based on the difference in the number of teeth between the movable internal gear 3 and the fixed internal gear 5 ("2" in the present embodiment), the number of planetary gear sets arranged around the sun gear 1 ("6" in the present embodiment), and the number of teeth of each of the first planetary gears 2 and the second planetary gears 4 ("17" in the present embodiment).

In the mechanical paradox planetary gear mechanism X according to the present embodiment, the planet-gear-mounted reference collars 6A obtained by integrally rotatably installing the first planetary gears 2 and the second planetary gears 4 on the reference collars 6A, the planet-gear-mounted first phase difference collars 6B obtained by integrally rotatably installing the first planetary gears 2 and the second planetary gears 4 on the first phase difference collars 6B, and the planet-gear-mounted second phase difference collars 6C obtained by integrally rotatably installing the first planetary gears 2 and the second planetary gears 4 on the second phase difference collars 6C are arranged around the sun gear 1 at pitches of 60 degrees in this order. The planet-gear-mounted reference collars 6A, the planet-gear-mounted first phase difference collars 6B, and the planet-gear-mounted second phase difference collars 6C are arranged on a diagonal line passing through the axis L of the sun gear 1 so as to face one another. By adopting such a layout, it is possible to maintain a state in which all six first planetary gears 2 mesh with the movable internal gear 3 and all six second planetary gears 4 mesh with the fixed internal gear 5.

In particular, in the present embodiment, by non-rotatably fitting both ends of the shaft 7 inserted into the shaft insertion hole 61 of each of the collars 6 to the carrier, it is possible to unitize the entire mechanical paradox planetary gear mechanism X in a state in which the collars 6 arranged around the sun gear 1 at pitches of 60 degrees can rotate around the axes of the shafts 7 integrally with the first planetary gears 2 and the second planetary gears 4. The six planetary gear sets including the first planetary gears 2 and the second planetary gears 4 are held by the shafts 7 and the carrier 8 at predetermined intervals in the circumferential direction via the collars 6, and are restrained from moving in the axial direction. In addition, the planet-gear-set-mounted collars 6 are supported by the shafts 7 so as to be rotatable in the forward and reverse directions.

Figure 4A:
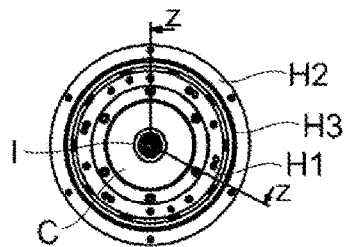
FIGS. 4A and 4B are views showing a speed reducer including the mechanical paradox planetary gear mechanism according to the embodiment.
Figure 4B:
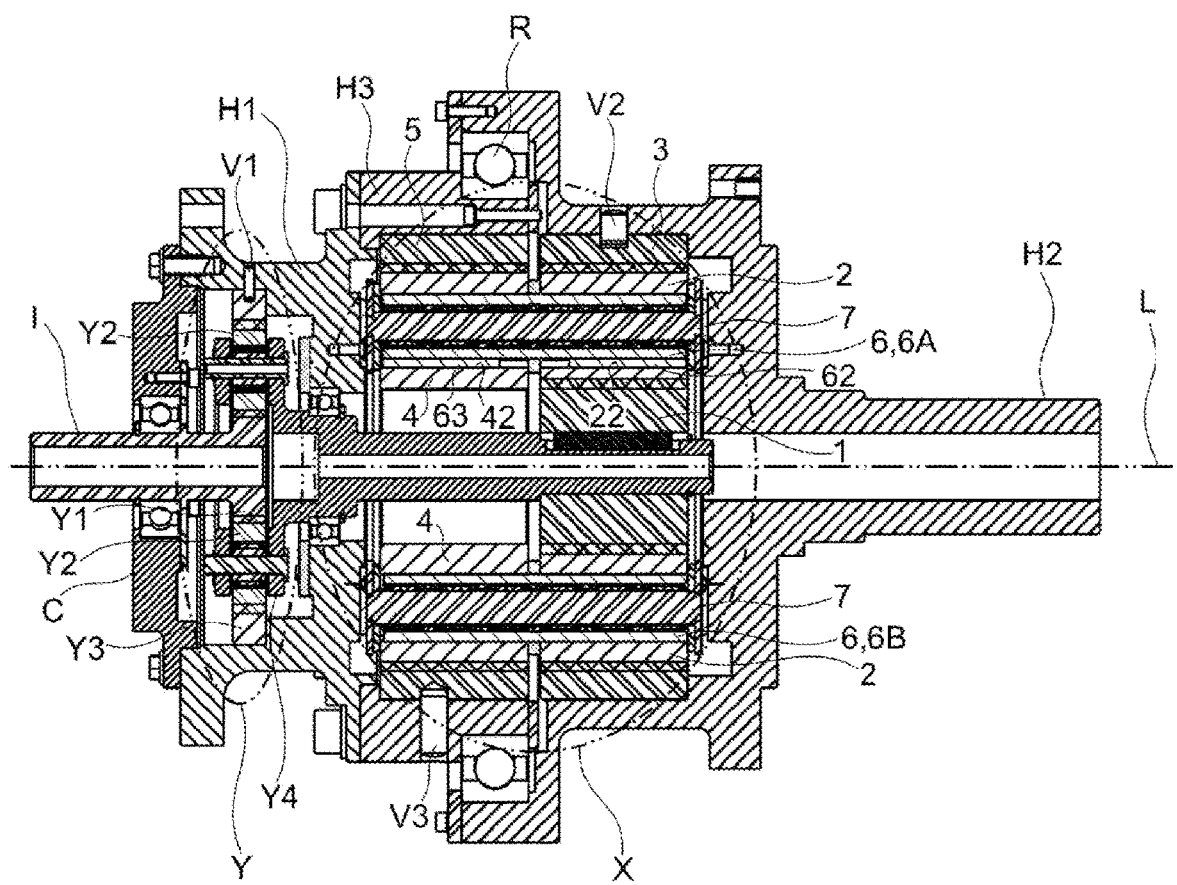

As shown in FIGS. 4A and 4B, the actuator of the present embodiment includes a planetary gear mechanism Y provided between an input shaft I integrally rotatable with a drive shaft of a motor and the sun gear 1 of the mechanical paradox planetary gear mechanism X. FIG. 4A is a front view of a speed reducer provided with the planetary gear mechanism Y and the mechanical paradox planetary gear mechanism X, and FIG. 4B is a sectional view taken along line z-z in FIG. 4A.

The planetary gear mechanism Y includes a sun gear Y1 integrally rotatable with the input shaft I, a plurality of planetary gears Y2 configured to rotate while revolving around the sun gear Y1 in a state in which the plurality of planetary gears Y2 meshes with the sun gear Y1, an internal gear Y3 arranged around the plurality of planetary gears Y2 so that the plurality of planetary gears Y2 mesh with the internal gear Y3, and a carrier Y4 as a rotating element configured to support the plurality of planetary gears Y2 and to extract the revolution motion of the plurality of planetary gears Y2. Such a planetary gear mechanism Y constitutes a speed reducer together with the mechanical paradox planetary gear mechanism X. The mechanical paradox planetary gear mechanism X of the present embodiment is configured such that the sun gear 1 is integrally rotatably fixed to the shaft-shaped output end of the carrier Y4 of the planetary gear mechanism Y.

According to the actuator provided with such a mechanical paradox planetary gear mechanism X, the input shaft I rotates when a motor (not shown) is supplied with electric power, and the rotation of the input shaft I is transmitted to the mechanical paradox planetary gear mechanism X and the planetary gear mechanism Y that constitute a speed reducer. That is, when the sun gear Y1 of the planetary gear mechanism Y rotates together with the rotation of the input shaft I, the rotation of the sun gear Y1 is transmitted to the planetary gears Y2. The planetary gears Y2 engaging with the internal gear Y3 revolve while rotating about their own axes. The rotation of planetary gears Y2 is transmitted to the carrier Y4. In this way, the rotational driving force of the input shaft I is transmitted to the carrier Y4 with the rotation speed of the input shaft I reduced. In the present embodiment, the internal gear Y3 is fixed to the input-side housing H1 with a screw V1 so as not to be rotatable relative to each other. Furthermore, the internal space of the input-side housing H1 is a space partitioned from the outside by an end cover C (see FIGS. 4A and 4B).

Then, when the sun gear 1 of the planetary gear mechanism Y rotates together with the rotation of the carrier Y4 of the planetary gear mechanism Y, the rotation of the sun gear 1 is transmitted to the six first planetary gears 2. These six first planetary gears 2 mesh with the movable internal gear 3 while rotating about their own axes.

At this time, the second planetary gears 4 connected to the first planetary gears 2 through the collars 6 and the shafts 7 also rotate integrally with the first planetary gears 2. The six second planetary gears 4 revolve by mesh with the fixed internal gear 5. Due to such rotation, the movable internal gear 3 rotates integrally with the output-side housing H2 connected by the screw V2. In this way, while the rotation of the input shaft I is transmitted to the output shaft (output-side housing H2), the rotation speed of the input shaft I is reduced at a predetermined rate (large reduction ratio) according to the difference in the number of teeth between the movable internal gear 3 and the fixed internal gear 5. In the present embodiment, a bearing R is provided between an intermediate housing H3 and an output shaft (output-side housing H2).

As described above, according to the mechanical paradox planetary gear mechanism X according to the present embodiment, by bringing the gear-side engaging portions 22 of the first planetary gears 2 into engagement with the first collar-side engaging portions 62 of the collars 6 and bringing the gear-side engaging portions 42 of the second planetary gears 4 into engagement with the second collar-side engaging portions 63 of the collars 6, it is possible to maintain a state in which the first planetary gears 2 and the second planetary gears 4 are assembled to the collar 6 at the same phase or at a predetermined phase difference. In particular, in the mechanical paradox planetary gear mechanism X according to the present embodiment, by making different the phases of the first collar-side engaging portions 62 and the second collar-side engaging portions 63 of the collars 6 while using gears having the same shape as the first planetary gears 2 and the second planetary gears 4, it is possible to unitize the first planetary gears 2 and the second planetary gears 4 in a state in which an appropriate phase difference (including a zero phase difference) is secured between the first planetary gears 2 and the second planetary gears 4 arranged on the same axes. This makes it possible to realize a structure in which the first planetary gears 2 and the second planetary gears 4 mesh with the movable internal gear 3 and the fixed internal gear 5 having different numbers of teeth, respectively. In the mechanical paradox planetary gear mechanism X according to the present embodiment, by maintaining an appropriate phase relationship between the first planetary gears 2 and the second planetary gears 4 through the use of the collars 6 and unitizing the planetary gears (the first planetary gears 2 and the second planetary gears 4) assembled to the collars 6 with high accuracy and in an integrally rotatable manner, it is possible to provide a self-supporting configuration that does not depend on the sun gear 1 or the internal gears (the movable internal gears 3 and the fixed internal gears 5), i.e., a configuration in which it is not the highest priority to support the planetary gears (the first planetary gears 2 and the second planetary gears 4) on the sun gear 1 and the internal gears (the movable internal gear 3 and the fixed internal gear 5) at the time of assembly. Thus, not only the assembly work but also the disassembly work and the reassembly work become easy, and the maintainability is improved.

In particular, in the mechanical paradox planetary gear mechanism X according to the present embodiment, there are adopted the gear-side engaging portions 22 and 42 which are formed by performing the same key groove processing on the axially extending collar insertion holes 21 and 41 of the first planetary gears 2 and the second planetary gears 4.

Therefore, as compared with, for example, a configuration in which the first planetary gears and the second planetary gears are fixed at a predetermined phase difference in a state in which the rotation shafts provided on the second planetary gears are inserted into the first planetary gears, it is not necessary to perform a process of fixing the first planetary gears and the second planetary gears as separate parts in a state in which the first planetary gears and the second planetary gears are positioned with high accuracy. This makes it possible to avoid a situation where the first planetary gears and the second planetary gears cannot be caused to mesh with the internal gears (the fixed internal gears and the movable internal gears) when the accuracy of the fixing process is low. Furthermore, in a configuration in which the first planetary gears and the second planetary gears are integrally provided as resin molded products or metal molded products at a predetermined phase difference, as the number of planetary gears arranged around the sun gear increases, the number of molds also increases, which directly leads to a cost increase. However, in the mechanical paradox planetary gear mechanism X according to the present embodiment, it is possible to use the first planetary gears and the second planetary gears molded through the use of a common mold. This is advantageous in terms of cost.

Furthermore, in the mechanical paradox planetary gear mechanism X according to the present embodiment, a high speed reduction rate can be obtained by coaxially rotating two internal gears (the movable internal gear 3 and the fixed internal gear 5) having different numbers of teeth. A high torque can be divisionally borne by the respective planetary gears (the first planetary gears 2 and the second planetary gears 4) by arranging six first planetary gears 2 around the sun gear 1 and arranging the same number of second planetary gears 4 as the first planetary gears 2. Since it is possible to realize size and weight reduction, the mechanical paradox planetary gear mechanism X can be suitably applied to an electric actuator for steering an aileron of an aircraft.

Although the embodiment of the present disclosure has been described above, the present disclosure is not limited to the configuration of the above embodiment. For example, the number of teeth and pitch of the sun gear, the first planetary gears, the second planetary gears, the fixed internal gear, and the movable internal gear that constitute the mechanical paradox planetary gear mechanism may be changed as appropriate, and the phase difference between the first planetary gears and the second planetary gears arranged on the same axes may be any value determined in consideration of the number of teeth thereof.

The number of first planetary gears arranged around the sun gear may be changed as appropriate. The number of second planetary gears may be the same as the number of first planetary gears.

In the above-described embodiment, there is illustrated an aspect in which the first internal gear meshing with the plurality of first planetary gears is a movable internal gear, and the second internal gear arranged in the same axis as the first internal gear is a fixed internal gear. Alternatively, it may be possible to adopt an aspect in which the first internal gear is a non-rotatable fixed internal gear and the second internal gear is a movable internal gear that can rotate around an axis. In this case, the mechanical paradox planetary gear mechanism performs its function if the output shaft is a non-rotatable fixed shaft and if the end cover C, the input-side housing H1, and the intermediate housing H3 in the above-described embodiment are rotatable.

Furthermore, in the present disclosure, the gear-side engaging portions of the first planetary gears and the second planetary gears may be set to keys or pins protruding toward the rotation centers of the respective planetary gears, and the first collar-side engaging portions and the second collar-side engaging portions of the collars may be set to key grooves or holes recessed toward the center axes of the collars.

In the above-described embodiment, there is illustrated the actuator in which the planetary gear mechanism is arranged between the input shaft and the sun gear. Alternatively, it may be possible to adopt an actuator in which the planetary gear mechanism is not provided and the input shaft is configured to be integrally rotatable with the sun gear of the mechanical paradox planetary gear mechanism (an actuator in which the speed reducer is composed of only the mechanical paradox planetary gear mechanism). In addition, the mechanical paradox planetary gear mechanism of the present disclosure may be used as an actuator other than the electric actuator for steering an aileron of an aircraft.

In addition, the specific configuration of each part is not limited to the above embodiment, and may be variously modified without departing from the spirit of the present disclosure.

According to the present disclosure in some embodiments, the first collar-side engaging portion and the second collar-side engaging portion provided on the collars are respectively engaged with the gear-side engaging portions of the first planetary gears and the second planetary gears according to the phase difference between the first planetary gears and the second planetary gears on the same axis. Therefore, the planetary gears (the first planetary gears and the second planetary gears) respectively meshing with two internal gears having different numbers of teeth can be integrally rotatably assembled at a predetermined phase difference with high accuracy. Common gears can be used as the planetary gears arranged at equal pitches around the sun gear. This makes it possible to provide a mechanical paradox planetary gear mechanism that can be used for steering ailerons of an aircraft or the like.

While certain embodiments have been described, these embodiments have been presented by way of example only, and are not intended to limit the scope of the disclosures. Indeed, the embodiments described herein may be embodied in a variety of other forms. Furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A mechanical paradox planetary gear mechanism, comprising:
   a sun gear configured to be rotatable together with rotation of an input shaft;
   a plurality of first planetary gears arranged around the sun gear at equal intervals, and configured to rotate about their own axes while revolving around the sun gear in a state in which the first planetary gears mesh with the sun gear;
   a first internal gear arranged around the plurality of first planetary gears, and configured to mesh with the plurality of first planetary gears;
   a second internal gear arranged in the same axis as the first internal gear;
   a plurality of second planetary gears respectively arranged on the same axes as the plurality of first planetary gears, and configured to mesh with the second internal gear;

a plurality of collars, each of which is mounted on an inner circumference of a corresponding one among the first planetary gears and an inner circumference of a corresponding one among the second planetary gears, and configured to be rotatable integrally with the corresponding one among the first planetary gears and the corresponding one among the second planetary gears, wherein the corresponding one among the first planetary gears and the corresponding one among the second planetary gears are on the same axis;

a plurality of shafts configured to rotatably support the collars, respectively; and a carrier configured to support the plurality of shafts so as not to be rotatable relative to each other, wherein one of the first internal gear and the second internal gear is a rotatable movable internal gear, and the other of the first internal gear and the second internal gear is a non-rotatable fixed internal gear, wherein the first planetary gears and the second planetary gears include axially-extending gear-side engaging portions formed on inner circumferential surfaces of the first planetary gears and the second planetary gears, respectively, wherein each of the collars includes, on an outer circumferential surface thereof:
 a first collar-side engaging portion that is of a convex shape or a groove shape, and capable of engaging with a gear-side engaging portion of the corresponding one among the first planetary gears; and
 a second collar-side engaging portion that is of a convex shape or a groove shape, and capable of engaging with a gear-side engaging portion of the corresponding one among the second planetary gears, and wherein the first collar-side engaging portion and the second collar-side engaging portion of each of the collars are position-shifted in a circumferential direction of said each of the collar, according to a phase difference between the corresponding one among the first planetary gears and the corresponding one among the second planetary gears calculated based on at least a difference in the number of teeth between the rotatable movable internal gear and the non-rotatable fixed internal gear.

2. The mechanical paradox planetary gear mechanism of claim 1, wherein the gear-side engaging portion of the first planetary gear is of a convex shape or a groove shape, and the gear-side engaging portion of the second planetary gear is of a convex shape or a groove shape.

3. The mechanical paradox planetary gear mechanism of claim 2, wherein the gear-side engaging portion of the corresponding one among the first planetary gears and the gear-side engaging portion of the corresponding one among the second planetary gears are position-shifted in the circumferential direction.

4. The mechanical paradox planetary gear mechanism of claim 1, wherein the gear-side engaging portion of the corresponding one among the first planetary gears and the gear-side engaging portion of the corresponding one among the second planetary gears are position-shifted in the circumferential direction.

5. The mechanical paradox planetary gear mechanism of claim 1, wherein the phase difference between the corresponding one among the first planetary gears and the corresponding one among the second planetary gears is calculated further based on the number of the first planetary gears arranged around the sun gear, and the number of teeth of each of the first planetary gears and the second planetary gears.

6. The mechanical paradox planetary gear mechanism of claim 1, wherein the first planetary gears and the second planetary gears have the same number of teeth.

* * * * *